United States Patent
Schwabl

(10) Patent No.: US 11,891,010 B2
(45) Date of Patent: Feb. 6, 2024

(54) LINING ELEMENT, AND PROCESS FOR MANUFACTURING A LINING ELEMENT

(71) Applicant: Bayerische Motoren Werke Aktiengesellschaft, Munich (DE)

(72) Inventor: Martin Schwabl, Hohenthann (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 733 days.

(21) Appl. No.: 16/577,217

(22) Filed: Sep. 20, 2019

(65) Prior Publication Data

US 2020/0010043 A1 Jan. 9, 2020

Related U.S. Application Data

(63) Continuation of application No. PCT/EP2018/056532, filed on Mar. 15, 2018.

(30) Foreign Application Priority Data

Mar. 23, 2017 (DE) ...................... 10 2017 204 963.4

(51) Int. Cl.
*B60R 21/2165* (2011.01)
*B29C 37/00* (2006.01)
(Continued)

(52) U.S. Cl.
CPC ...... *B60R 21/2165* (2013.01); *B29C 37/0057* (2013.01); *B29C 44/146* (2013.01);
(Continued)

(58) Field of Classification Search
None
See application file for complete search history.

(56) References Cited

U.S. PATENT DOCUMENTS 4,791,019 A * 12/1988 Ohta ...................... B32B 27/40
428/317.5
5,395,668 A * 3/1995 Ito ........................ B29C 43/183
428/304.4
(Continued)

FOREIGN PATENT DOCUMENTS

DE 101 28 745 A1 1/2003
DE 101 64 761 A1 6/2003
(Continued)

OTHER PUBLICATIONS

WO-2008087014-A1 (Lippert) Jul. 2008 (online machine translation), [Retrieved on Nov. 28, 2022]. Retrieved from: Espacenet & Google Patents (Year: 2008).*
(Continued)

*Primary Examiner* — Alison L Hindenlang
*Assistant Examiner* — Andrés E. Behrens, Jr.
(74) *Attorney, Agent, or Firm* — Crowell & Moring LLP

(57) ABSTRACT

A lining element for use in a vehicle in order to cover an airbag includes a dimensionally stable backing layer with a first predetermined breaking region which is delimited from a surrounding region and/or from a second predetermined breaking region by at least one predetermined breaking line, where a plurality of regularly spaced predetermined breaking points are disposed along the predetermined breaking line.

7 Claims, 2 Drawing Sheets

(51) Int. Cl.
*B29C 44/14* (2006.01)
*B29C 44/42* (2006.01)
*B32B 5/20* (2006.01)
*B32B 9/02* (2006.01)
*B29C 69/02* (2006.01)
*B60R 21/237* (2006.01)
*B29D 99/00* (2010.01)
*B29K 23/00* (2006.01)
*B29K 509/08* (2006.01)
*B29K 711/08* (2006.01)
*B29L 31/30* (2006.01)

(52) U.S. Cl.
CPC ............ *B29C 44/428* (2013.01); *B29C 69/02* (2013.01); *B29D 99/005* (2013.01); *B32B 5/20* (2013.01); *B32B 9/025* (2013.01); *B29K 2023/12* (2013.01); *B29K 2509/08* (2013.01); *B29K 2711/08* (2013.01); *B29L 2031/3038* (2013.01); *B32B 2262/101* (2013.01); *B32B 2266/025* (2013.01); *B32B 2605/003* (2013.01); *B60R 21/237* (2013.01)

(56) References Cited

U.S. PATENT DOCUMENTS

| | | | | | |
|---|---|---|---|---|---|
| 5,447,328 | A | * | 9/1995 | Lannazzi | B29C 39/026 280/732 |
| 5,564,731 | A | * | 10/1996 | Gallagher | B60R 13/0256 280/732 |
| 5,863,064 | A | * | 1/1999 | Rheinlander | B29C 37/0057 280/732 |
| 6,089,642 | A | | 7/2000 | Davis, Jr. et al. | |
| 6,451,233 | B1 | * | 9/2002 | Byma | B60R 21/213 264/46.7 |
| 6,773,795 | B2 | * | 8/2004 | Byma | B60R 21/213 280/730.2 |
| 6,805,542 | B2 | * | 10/2004 | Byma | B29C 44/086 425/120 |
| 2003/0020202 | A1 | * | 1/2003 | Ueno | B60R 21/2165 425/298 |
| 2004/0164531 | A1 | * | 8/2004 | Riha | B29C 59/16 280/732 |
| 2009/0127838 | A1 | | 5/2009 | Hayashi | |
| 2010/0219662 | A1 | * | 9/2010 | Schirmer | B29C 37/0057 264/250 |
| 2014/0042767 | A1 | * | 2/2014 | Filipp | B32B 3/263 296/70 |

FOREIGN PATENT DOCUMENTS

| | | | | |
|---|---|---|---|---|
| DE | 10 2009 048 893 B4 | | 4/2011 | |
| DE | 10 2014 103 940 A1 | | 9/2015 | |
| DE | 10201610176 | * | 2/2016 | ........... B29C 59/007 |
| JP | 2010-158931 A | | 7/2010 | |
| WO | WO-2008087014 A1 | * | 7/2008 | ........... B60R 21/216 |

OTHER PUBLICATIONS

DE-10201610176 (Rijpkema) Feb. 2016 (online machine translation), [Retrieved on Mar. 7, 2023]. Retrieved from: Google (Year: 2016).*

PCT/EP2018/056532, International Search Report dated May 29, 2018 (Three (3) pages).

German Search Report issued in German counterpart application No. 10 2017 204 963.4 dated Dec. 18, 2017, with Statement of Relevancy (Six (6) pages).

* cited by examiner

LINING ELEMENT, AND PROCESS FOR MANUFACTURING A LINING ELEMENT

CROSS REFERENCE TO RELATED APPLICATIONS

This application is a continuation of PCT International Application No. PCT/EP2018/056532, filed Mar. 15, 2018, which claims priority under 35 U.S.C. § 119 from German Patent Application No. 10 2017 204 963.4, filed Mar. 23, 2017, the entire disclosures of which are herein expressly incorporated by reference.

BACKGROUND AND SUMMARY OF THE INVENTION

The invention relates to a lining element for use on a vehicle for covering an airbag.

During the production of a vehicle, airbags are covered with lining elements for safety reasons and in order to improve the design. So that the airbag functions if triggered, the lining elements are designed in such a manner that they easily break or easily tear at predefined breaking points in comparison to the other regions of the lining element and allow the airbag to pass. The airbag penetrates or breaks through the lining elements in a previously defined predetermined breaking region. A predetermined breaking region is surrounded by a predetermined breaking contour. In the event of loading by the airbag, the predetermined breaking region is intended to break or tear along the predetermined breaking contour. For this purpose, the lining element is generally weakened along the predetermined breaking contour. Various methods for weakening the predetermined breaking contour are known in the prior art. The methods can essentially be broken down into two generic types. Firstly, into retrospective methods which are used after the production of the lining element, for example by means of thermal or mechanical machining, such as lasering, and secondly into integral methods which are used integrally during the production of the lining element. Methods following the production of the lining element are expensive and time-consuming because of additional machines, working steps, storage costs and handling and maintenance times. In the case of methods which are used integrally during the production of the lining element, the weakening of the lining element frequently stands out by means of a predetermined breaking contour on a visible side which faces the vehicle occupant, and therefore lines and different contours and structures can be seen which are generally perceived to be unaesthetic and annoying. In order to produce an aesthetic, visually flawless and at the same time functional surface on the visible side, further machines, working steps, storage costs, handling and maintenance times are required, which additionally increases the production costs.

The invention is therefore based on the object of overcoming the previously stated disadvantages and providing a lining element with a predetermined breaking region or a predetermined breaking line, which predetermined breaking region or predetermined breaking line does not stand out on a decorative layer which is arranged on a visible side, wherein the predetermined breaking region is intended to be produced simply, cost-efficiently and integrally during the production of the lining element.

According to the invention, a lining element for use on a vehicle for covering an airbag is proposed, wherein the lining element comprises a dimensionally stable backing layer with at least one predetermined breaking region. The predetermined breaking region is delimited from a region of the lining element, the region surrounding the predetermined breaking region, by a predetermined breaking contour, wherein the predetermined breaking contour consists of at least one predetermined breaking line. A rectangular predetermined breaking region is delimited on in each case one of its sides on the rear surface of the backing layer, for example, by a predetermined breaking contour consisting of four predetermined breaking lines. The predetermined breaking region is delimited from a surrounding region and/or a further predetermined breaking region by at least one predetermined breaking line, wherein a multiplicity of regularly spaced predetermined breaking points is formed along the or in each case a predetermined breaking line. The predetermined breaking line is a one-dimensional profile of a predetermined break on the visible side of the backing layer, wherein the predetermined breaking points weaken the thickness D of the lining element or the backing layer such that the lining element breaks along the predetermined breaking line when loaded as intended. The backing layer is dimensionally stable at ambient temperatures as intended, but at least to 85° C.

Furthermore, a development is of advantage in which the backing layer has a visible side and a rear side facing away from the visible side, on the visible side a decorative layer, preferably composed of leather, is arranged flat on the backing layer, and the multiplicity of predetermined breaking points is arranged on the visible side. The decorative layer serves for the optical and haptic configuration of the backing layer, wherein the decorative layer can be broken through by the airbag.

Furthermore, an embodiment is advantageous in which a first surface of the decorative layer forms a plane together with a second surface of the decorative layer. The first surface lies directly above a predetermined breaking point or the predetermined breaking line lying on the visible side and the second surface is directly adjacent to the first surface and completely surrounds the first surface. Owing to the fact that the first surface and second surface form a plane, the predetermined breaking points of the predetermined breaking line cannot be seen on the visible side with a naked eye by an observer.

In an advantageous development, the backing layer forms at least one welding rib on its rear side, wherein at least some of the predetermined breaking points of the multiplicity of predetermined breaking points are arranged on the visible side of the backing layer opposite the at least one welding rib. By means of the arrangement of the predetermined breaking points directly opposite a welding rib, a multiplicity of projections can be designed to be longer on one die side of a die in order to form the predetermined breaking points during the production and can be brought closer to the opposite die side of the die without a collision of the multiplicity of projections with the opposite die side occurring.

In a further advantageous variant embodiment, the rear side of the backing layer comprises a reinforcing network. The reinforcing network is arranged on or in the backing layer and is preferably composed of aramid fibers. By means of the reinforcing network, the predetermined breaking regions are held on at least one side during triggering of the airbag, and therefore the predetermined breaking regions are not completely detached from the surrounding regions or are still connected to the surrounding regions.

Furthermore, an embodiment is advantageous in which the backing layer is an integral foam and/or is formed from a plastics material or a plastics composite material. In an advantageous manner, the backing layer can be formed from a plastics composite material, wherein the plastics composite material comprises polypropylene and glass fibers up to 20%.

An exemplary embodiment is furthermore particularly advantageous, in which one predetermined breaking point of the multiplicity of predetermined breaking points is a recess in the backing layer. The recess is open to the surroundings toward one side and is bounded on the remaining sides of the recess by the backing layer.

In a further advantageous embodiment, the recess is cylindrical, cuboidal, conical or pyramid-shaped, and/or comprises rounded edges. A hexagonal basic shape of the recess, in which in each case one corner of the recess faces in the direction of the predetermined breaking line, is likewise advantageous.

Furthermore, an embodiment is of advantage, in which the recesses are 1 mm to 4 mm deep, 1 mm to 3 mm wide, 1 mm to 10 mm long and/or are spaced by a distance A of 1 mm to 4 mm and/or the backing layer is 2 mm to 6 mm thick. In a cylindrical shape, the length L corresponds to the width B as diameter X. The distance between two recesses of a multiplicity of predetermined breaking points or the distance between the recess and a further recess should in each case be measured from an edge region or a side surface in the direction of the predetermined breaking line to the closest side surface of the closest recess along the predetermined breaking line. It is furthermore advantageous that, in a development, the remaining residual thickness R of the backing layer at a recess is 0.5 mm to 3 mm. The recess has a respectively appropriate depth T for the remaining thickness R of the backing layer. The depth T of the recess plus the residual thickness R of the backing layer results in the thickness D of the backing layer in the surrounding region or directly next to the recess.

An exemplary embodiment is also advantageous in which when the lining element is correctly installed in a vehicle as an airbag covering, the at least one predetermined breaking region is arranged above a folded air sack of an airbag such that the folded air sack, as it unfolds, strikes and breaks through the predetermined breaking region.

In a further advantageous alternative embodiment, the predetermined breaking points of the multicity of predetermined breaking points of a first predetermined breaking line are spaced at a first distance from one another, and the predetermined breaking points of the multiplicity of predetermined breaking points of a second predetermined breaking line are spaced at a second distance from one another that differs from the first distance.

By means of different distances between the recesses along a predetermined breaking line or different distances between the recesses of different predetermined breaking lines, predetermined breaking procedures and predetermined breaking forces can be set in a targeted manner. It is possible to produce predetermined breaking lines which break first and predetermined breaking lines which break second, the predetermined breaking lines breaking in a determined sequence. Furthermore, the predetermined breaking lines can be set by setting the necessary predetermined breaking force on the airbag and the unfolding procedure of the airbag.

In an advantageous development, the predetermined breaking force can furthermore be set by the residual thickness R of the backing layer on one of the recesses of a multiplicity of predetermined breaking points. If the residual thickness R of the backing layer on all of the recesses of a predetermined breaking line is identical, a consistent predetermined breaking force dependent on the residual thickness prevails along the respective predetermined breaking line. If the residual thickness R at the recesses of the multiplicity of predetermined breaking points varies, the predetermined breaking force which is dependent on the residual thickness varies along the respective predetermined breaking line.

The decorative layer can be designed as a film hinge, and therefore a predetermined breaking region is held on one side by the film hinge and cannot be completely jettisoned.

According to the invention, a method for producing a lining element is furthermore proposed. The method is an injection molding integral foam method, in which the lining element is arranged in a cavity between a first and a second die side of a die. During the method, an embossing stroke takes place by the first die side and the second die side being brought toward each other before the cavity has been enlarged in the injection molding integral foam method in order to foam an injected material. By means of the embossing stroke, a multiplicity of projections which are arranged or formed on the first die side in the direction of the second die side are impressed into the lining element in order to form the recesses.

Furthermore, according to the invention, the use of a lining element for covering an airbag in a vehicle is proposed. The lining element according to the invention is preferably arranged above a front passenger's front airbag in the front passenger's region.

The recesses are produced integrally during the production of the backing layer from integral foam in the integral foam method, and therefore the edge regions or edge layer regions or boundary layer regions of the backing layer have small pores, are flat and completely closed both with respect to the surroundings and with respect to the recesses or predetermined breaking points, whereas the regions located in the interior of the backing layer have large pores or are partly hollow.

The features disclosed above can be combined as desired if this is technically possible and the features do not contradict one another.

Other objects, advantages and novel features of the present invention will become apparent from the following detailed description of one or more preferred embodiments when considered in conjunction with the accompanying drawings.

DETAILED DESCRIPTION OF THE DRAWINGS

The figures are shown schematically by way of example. The same reference signs in the figures indicate identical functional and/or structural features.

Figure 1:
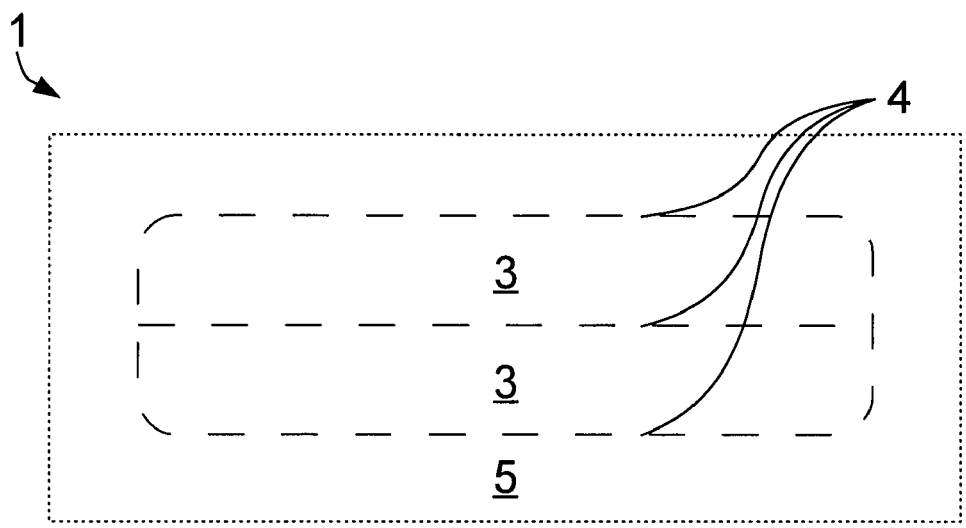
FIG. 1 shows a detail of a lining element with a predetermined breaking contour with two predetermined breaking regions from a horizontal projection.

FIG. 1 shows a lining element 1 with two predetermined breaking regions 3. The predetermined breaking regions 3 are each delimited by four predetermined breaking lines 4, wherein one predetermined breaking line 4 lies between the predetermined breaking regions 3 and delimits the two predetermined breaking regions 3 from each other such that a total of seven predetermined breaking lines 4 run on the lining element 1. The predetermined breaking lines 4 of the predetermined breaking regions 3 that provide a delimitation with respect to the surrounding region 5 merge into one another such that the corners of the predetermined breaking regions 3 are rounded with respect to the surrounding region 5. The individual predetermined breaking points are arranged along the respective predetermined breaking lines, wherein the distances and dimensions of the predetermined breaking points of the predetermined breaking lines are coordinated with respect to one another between the predetermined breaking lines.

Figure 2:
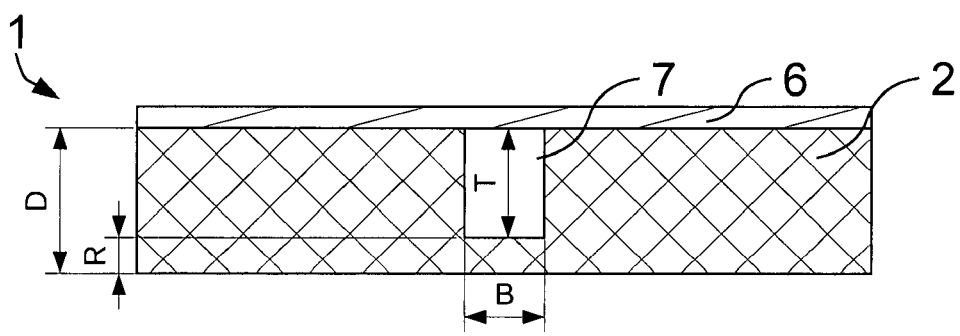
FIG. 2 shows a sectional view through a backing layer.

FIG. 2 shows a sectional view through a lining element 1. A recess 7 is arranged on the visible side of a backing layer 2 and a decorative layer 6 composed of leather is arranged on the visible side of the backing layer 2 such that the recess 7 is covered. The backing layer 2 is composed of a fiber composite material foamed to form an integral foam, wherein the backing layer is produced in the injection molding integral foam method. The edge regions of the backing layer 2 essentially have no pores or very small pores in comparison to the inner regions of the backing layer, and therefore the backing layer 2 has a flat surface from the outside. In the interior of the backing layer 2, large pores or cavities are partly formed, and therefore the backing layer has a low weight and high strength. The recess 7 has a depth T in the backing layer 2, and therefore the thickness D of the backing layer 2 in the region of the recess 7 is reduced to a residual thickness R. The surface of a first region of the decorative layer 6 on the visible side, the region lying directly above a recess 7, forms a common plane together with a second region which lies directly adjacent to the first region on the decorative layer 6, and therefore the decorative layer on the visible side of the backing layer does not have any recesses or jumps in level in a region opposite the recesses.

FIGS. 3a to 3d show various variant shapes of the predetermined breaking points or recesses 7. The recesses can be formed in different ways depending on the predetermined breaking force sought, the predetermined breaking profile and the residual thickness sought.

Figures 3A, 3B, 3C, 3D:
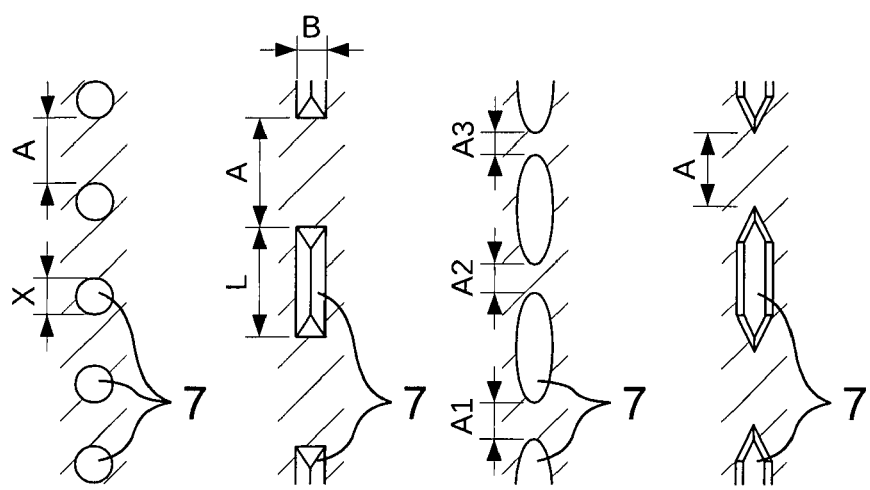
FIGS. 3a-3d show various recess geometries from the top view.

In FIG. 3a, the recesses 7 are of round design in their basic shape or are of cylindrical design in their geometry. The width B corresponds to the length L as diameter X, and the individual recesses 7 are spaced from one another at a constant distance A.

FIG. 3b shows recesses of a multiplicity of predetermined breaking points, wherein the recesses are formed in a pyramid-shaped manner, stretched along the predetermined breaking line.

In FIG. 3c, the recesses are of oval design and are spaced from one another with distances A1, A2 and A3 becoming uniformly smaller.

FIG. 3d shows recesses of a multiplicity of predetermined breaking points which are formed hexagonally in their basic shape and taper from the visible side in the direction of the rear side such that a respective bottom surface of the respective recess 7 furthermore has a hexagonal shape which is, however, smaller than the hexagonal basic shape. By tapering in a section transversely with respect to the predetermined breaking line, the recess is of trapezoidal design. In each case one edge of the hexagonal shape on each side of the hexagonal shape in the longitudinal direction faces in the direction of the predetermined breaking line.

Figure 4A:
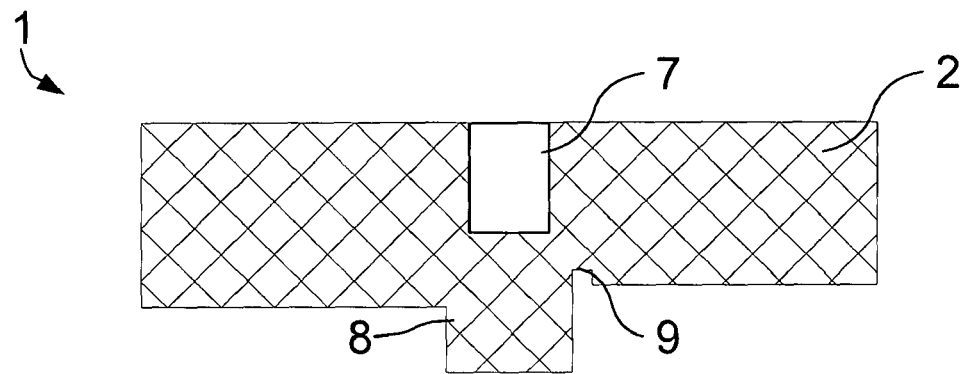
FIGS. 4a-4c show various states of the backing layer during the method for producing the backing layer.
Figure 4B:
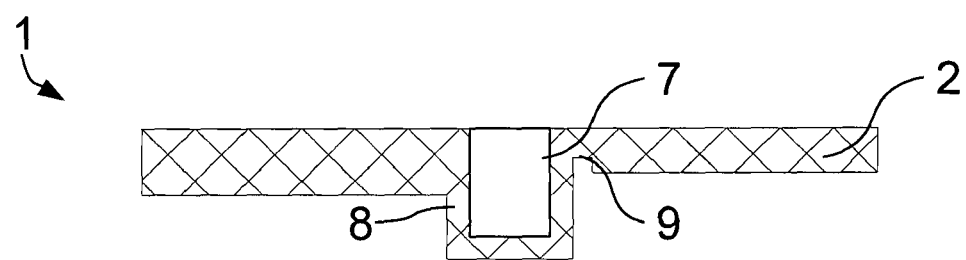
Figure 4C:
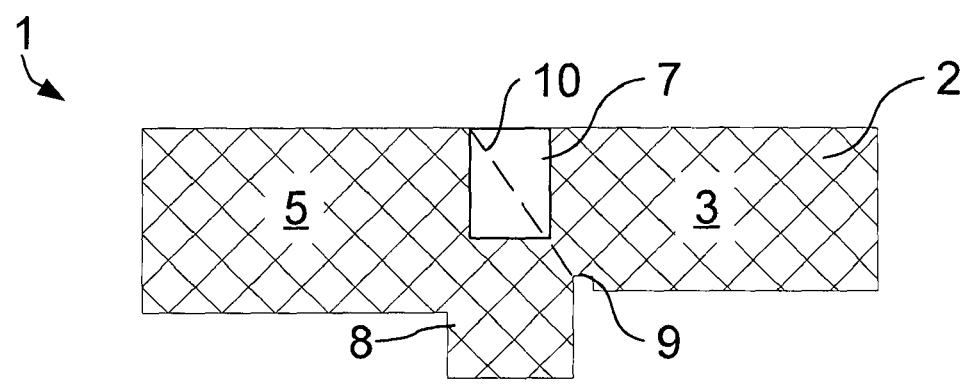

FIGS. 4a to 4c each show a state of the backing layer 2 during the production of the lining element 1 by the injection molding integral foam method as a cross section through the backing layer 2.

In FIG. 4a, the backing layer 2 can be seen after injection of the material of which the backing layer 2 is composed. The backing layer 2 forms a welding rib 8 on its rear side opposite the recess 7 and, on the welding rib 8, a notch 9 which at least partly encircles the predetermined breaking region.

In FIG. 4b, the backing layer 2 from FIG. 4a has been compressed by the die by the first die side and the second die side having been brought toward each other. In the process, the projections dip into the welding rib 8 in order to produce the recesses 7. The projections which dip into the welding rib 8 can be designed to be longer than projections which do not dip into the welding rib 8, since the projections would otherwise collide with the opposite die side.

In FIG. 4c, the cavity in which the backing layer 2 from FIG. 4b is arranged in a die has been enlarged. By means of chemical or physical blowing agents, the backing layer 2 in the cavity is expanded or foamed. As the cavity increases, those inner regions of the backing layer 2 which have not yet solidified expand. The expansion of the inner regions gives rise to the internal foam structure. Furthermore, the profile of the sought breaking profile 10 through the backing layer 2 can be seen in FIG. 4c in the cross section of the backing layer 2. The sought breaking profile 10 extends from the notch 9 through the backing layer 2 into the recess 7. The predetermined breaking region 3 lies on the right of the breaking profile 10 in FIG. 4c, and the surrounding region 5 lies on the left of the breaking profile 10.

The invention is not restricted in its embodiment to the preferred exemplary embodiments indicated above. On the contrary, a number of variants are conceivable which use the solution illustrated even in fundamentally different embodiments. For example, the multiplicity of projections which are arranged on the first die side could be designed as retractable and extendable pins which can be retracted and extended into the first die side such that the distance between the first die side and the second die side can be freely selected and the retractable and extendable pins can be freely set in their height in relation to the first die side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a lining element by an injection molding integral foam method, wherein the lining element comprises:
a dimensionally stable backing layer with a first predetermined breaking region which is delimited from a surrounding region and/or from a second predetermined breaking region by at least one predetermined breaking line, wherein a plurality of regularly spaced predetermined breaking points are disposed along the predetermined breaking line, wherein the breaking points are recesses in the backing layer, wherein the backing layer has a visible side and a rear side facing away from the visible side, and wherein the recesses are disposed only on the visible side of the backing layer such that the recesses have a respective depth in the backing layer that reduces a thickness of the backing layer in regions of the recesses to a residual thickness; and a decorative layer disposed flat on the backing layer on the visible side of the backing layer, wherein a first surface of the decorative layer directly above one of the plurality of regularly spaced predetermined breaking points disposed on the visible side forms a plane together with a second surface of the decorative layer, wherein the second surface is directly adjacent to the first surface and completely surrounds the first surface such that the decorative layer on the visible side of the backing layer does not have any recesses in a region opposite the recesses of the backing layer;

and the method comprising:

injecting a fiber composite material into a cavity formed between a first die side and a second die side of a die to form the backing layer;

compressing the backing layer by bringing the first die side and the second die side of the die toward each other before the cavity formed between the first die side and the second die side has been enlarged in the injection molding integral foam method in order to foam the injected fiber composite material and, via the compressing, forming the recesses in the backing layer by impressing a plurality of projections which are disposed or formed on the first die side into the backing layer;

after the compressing, enlarging the cavity formed between the first die side and the second die side and foaming the injected fiber composite material of the backing layer such that the backing layer is expanded; and removing the backing layer from the die and disposing the decorative layer flat on the visible side of the backing layer such that the first surface of the decorative layer directly above one of the plurality of regularly spaced predetermined breaking points disposed on the visible side forms the plane together with the second surface of the decorative layer and such that the decorative layer on the visible side of the backing layer does not have any recesses in a region opposite the recesses of the backing layer.

2. The method according to claim 1, wherein the decorative layer is leather.

3. The method according to claim 1, wherein the backing layer forms a welding rib on the rear side and wherein at least some of the plurality of regularly spaced predetermined breaking points are disposed opposite the welding rib.

4. The method according to claim 1, wherein the rear side of the backing layer has a reinforcing network which is disposed on the backing layer or in the backing layer.

5. The method according to claim 4, wherein the reinforcing network includes aramid fibers.

6. The method according to claim 1, wherein the recesses have a shape that is cylindrical, cuboidal, conical, or pyramidal and/or wherein edges of the recesses are rounded.

7. The method according to claim 1, wherein the recesses have a depth of between 1 mm and 4 mm, a width of between 1 mm and 3 mm, a length of between 1 mm and 10 mm, and/or wherein a distance from one recess to a further recess is between 1 mm and 4 mm, and/or wherein the backing layer has a thickness of between 2 mm and 6 mm.

\* \* \* \* \*